Oct. 29, 1963 E. O. CONRAD ETAL 3,108,840
STORAGE CONTAINER
Filed Dec. 5, 1960 6 Sheets-Sheet 6
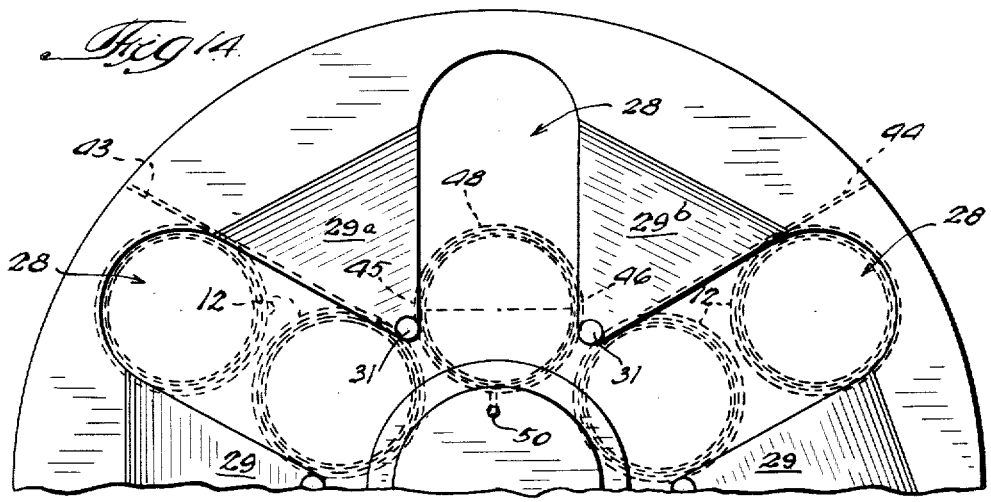
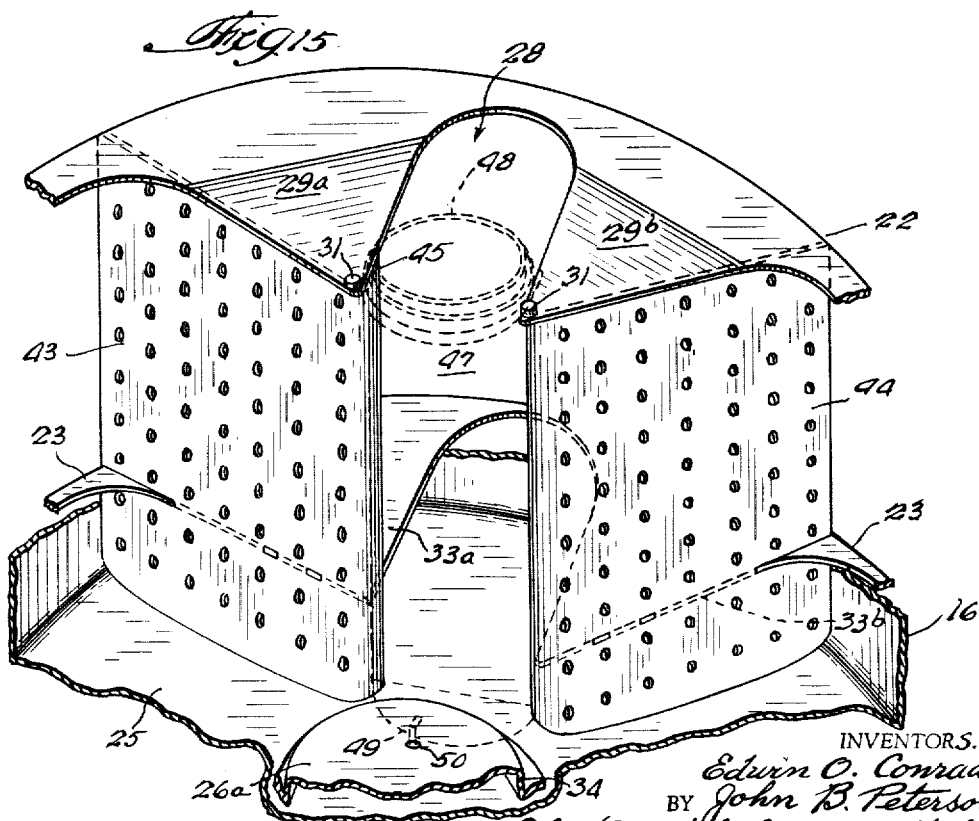
INVENTORS.
Edwin O. Conrad &
BY John B. Peterson

United States Patent Office

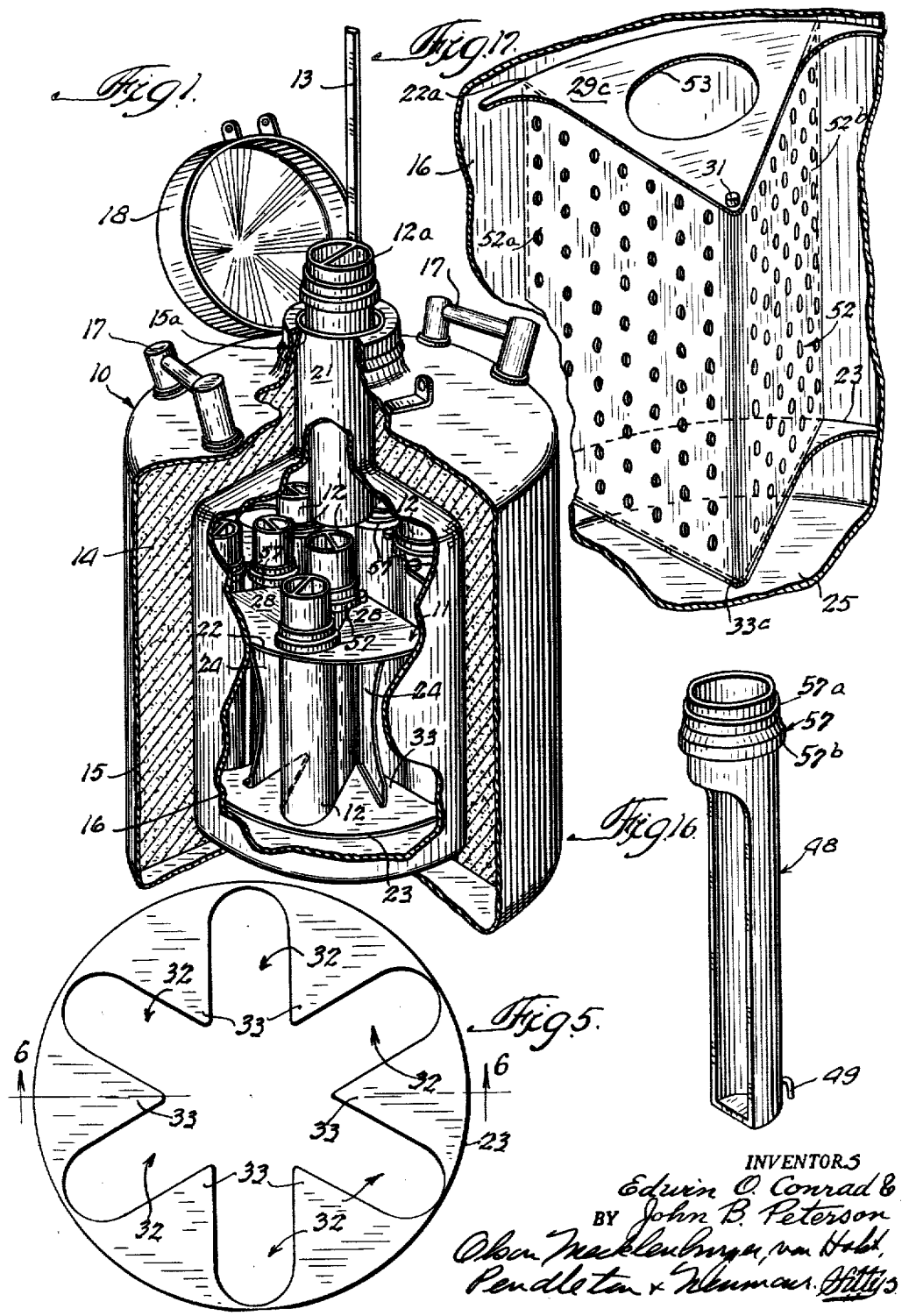

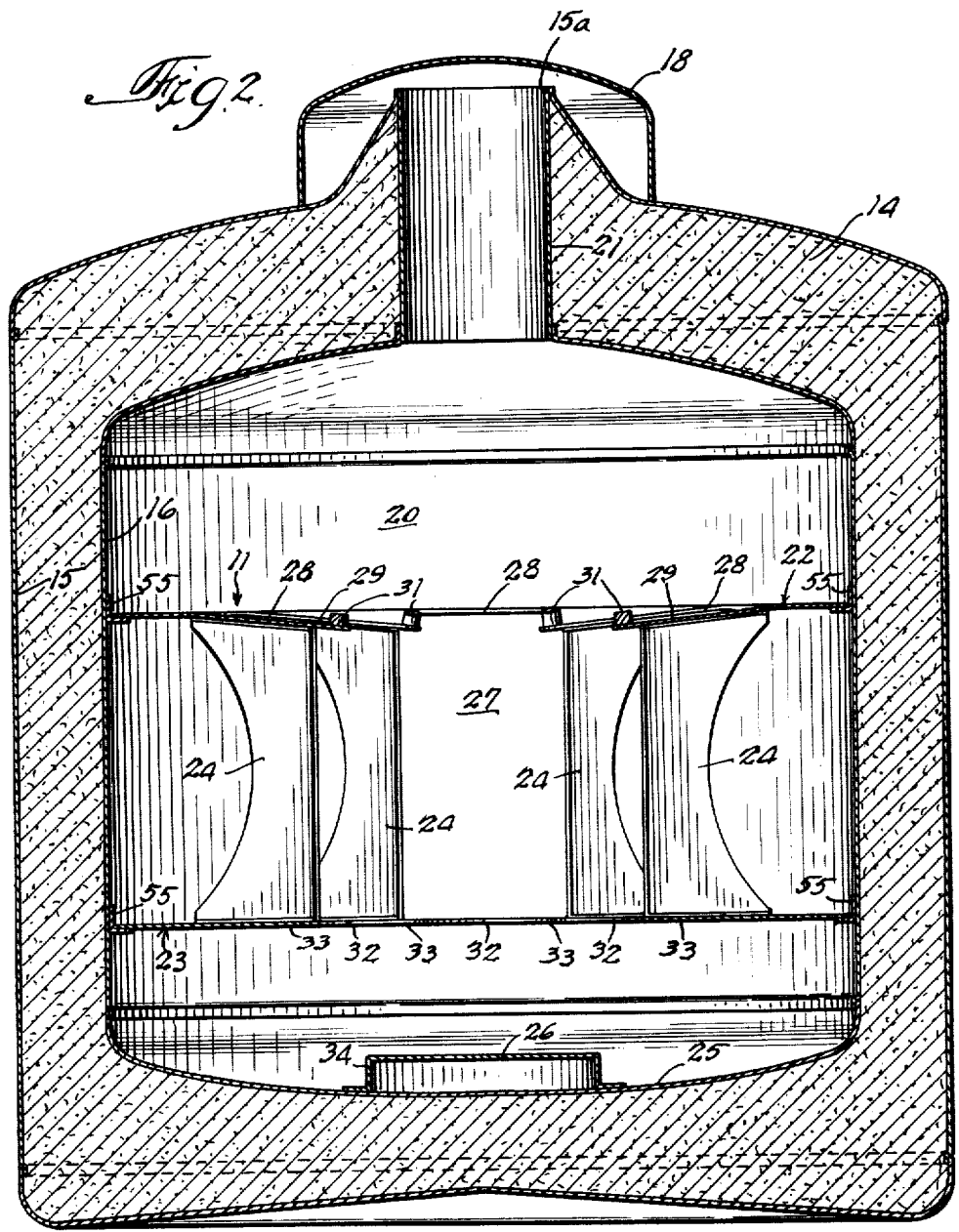

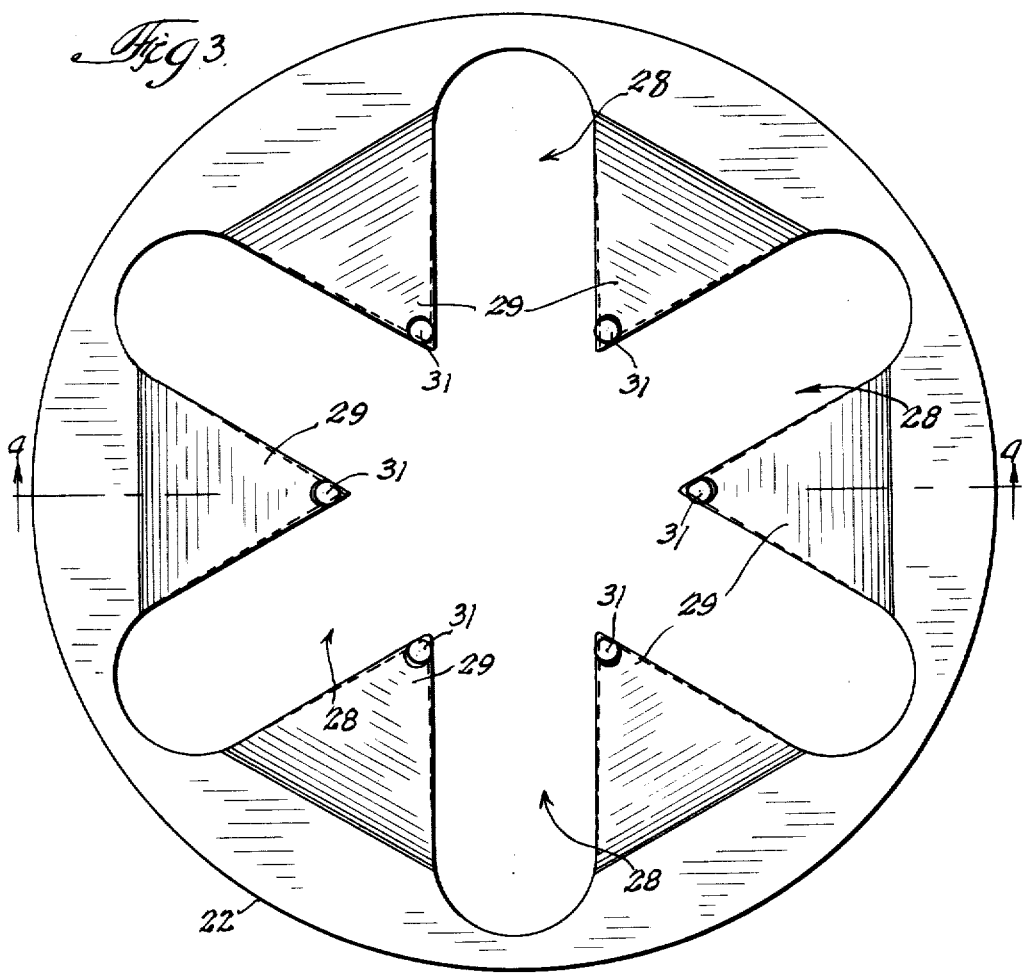
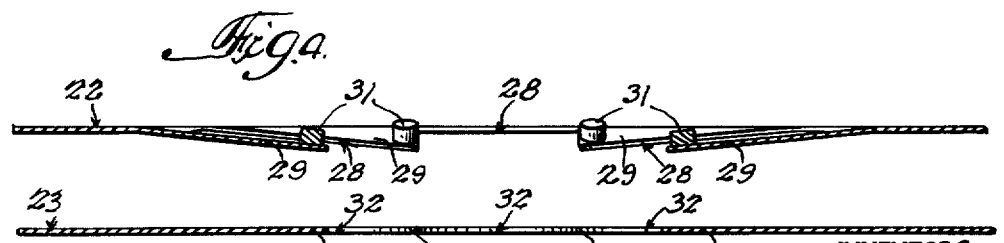

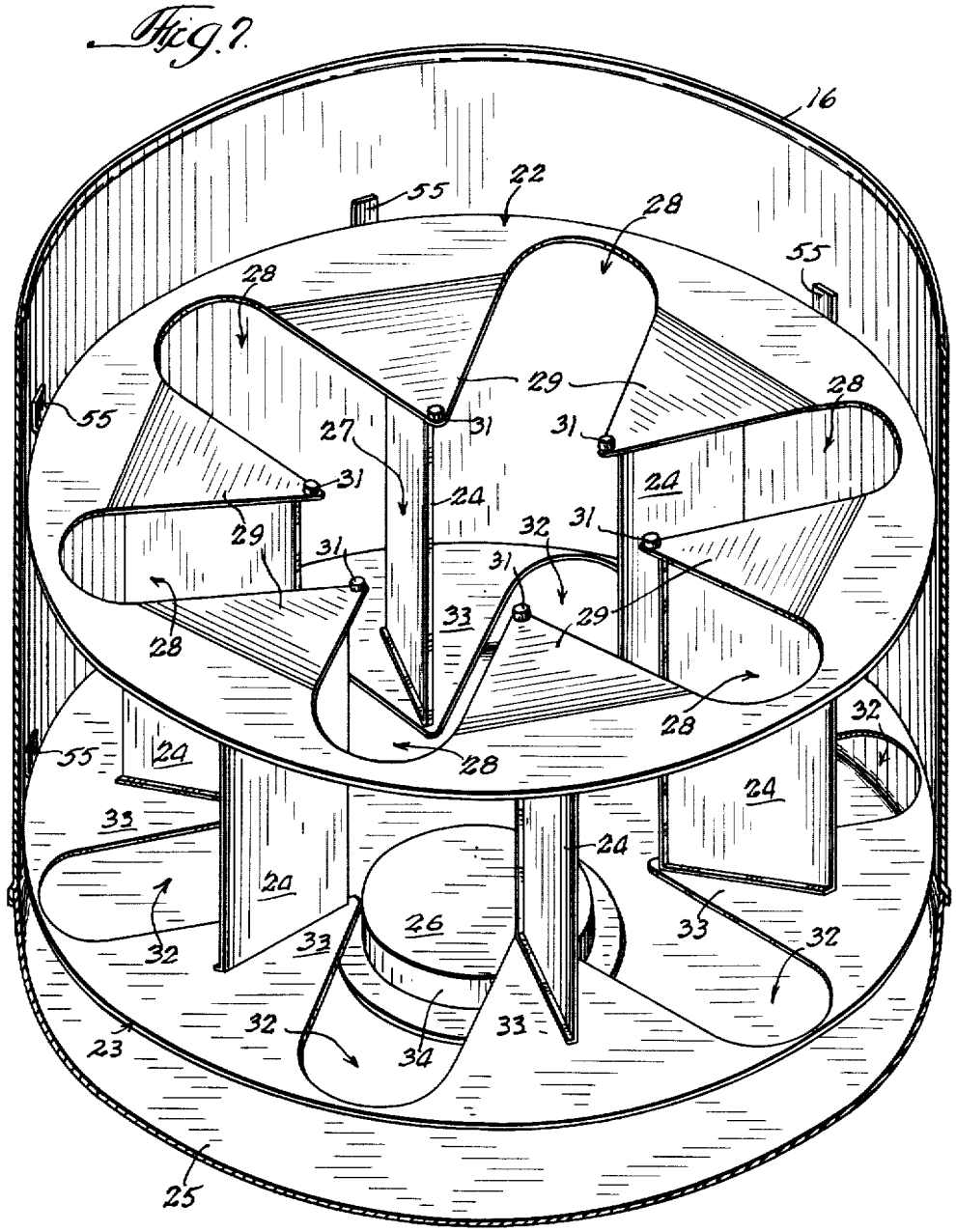

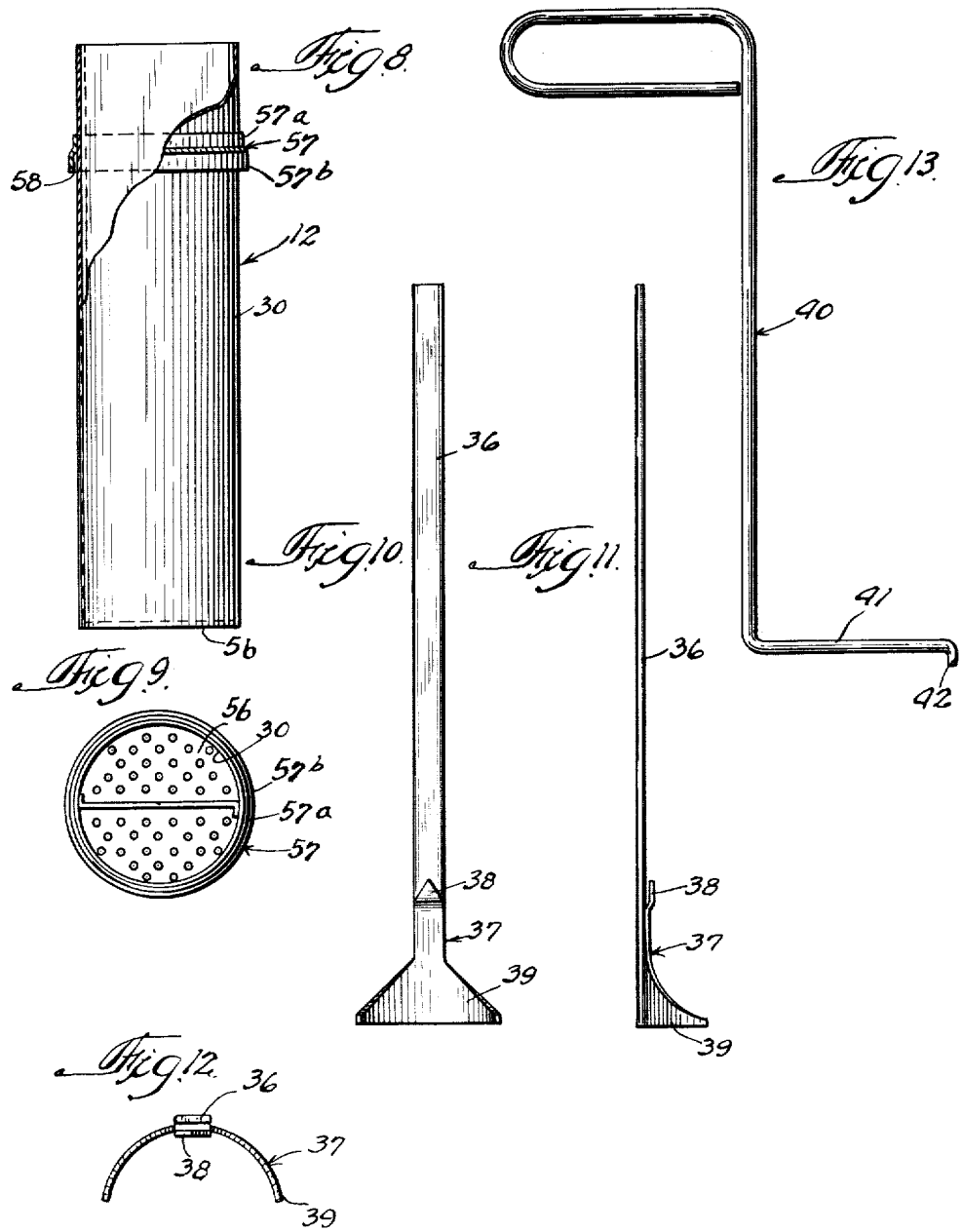

3,108,840
Patented Oct. 29, 1963

---

3,108,840
STORAGE CONTAINER
Edwin O. Conrad, 1730 Vahlen St., and John B. Peterson, 1954 Melrose St., both of Madison, Wis.
Filed Dec. 5, 1960, Ser. No. 73,563
14 Claims. (Cl. 312—214)

This invention relates to improvements of the internal storage structure in cold-storage containers and more specifically relates to such improvements in vacuum-vessel cryogenic storage units to increase their storage capacity without significantly increasing their size or impairing their insulating characteristics.

The concepts of the invention are illustrated by and will be discussed with relation to a vacuum-vessel cryogenic storage container normally utilized for shipping and field storing of frozen bovine semen. However, it is clear that the invention is adapted and adaptable for other uses, some of which will be pointed out below.

One process for storing, shipping and retrieving frozen bovine semen for field use by individual technicians involves capsulating and freezing the semen in ampules, then maintaining the semen at extremely low temperatures by submergence of the ampules in liquid nitrogen at atmospheric pressure. This maintains the semen at a temperature of about −193° C., the boiling point of the liquid nitrogen. These extremely low temperatures raise several problems in storage, shipping and handling of this material, including: the design of a container which will minimize evaporation of the nitrogen and thus maintain the requisite cold conditions in the field for a satisfactory period of time (hereinafter referred to as field-holding time), providing maximum storage capacity, and providing a broad selection of ampules which are readily selectively retrievable under field conditions without exposing the other ampules to ambient atmospheric conditions, all within the limits of size and weight of a unit which can be handled and transported by a single field technician without special equipment.

One container which has obtained wide usage in this area is a metal vacuum vessel utilizing the Dewar-vessel principle but including an insulating material in the air-evacuated space between the walls. Liquid nitrogen is placed in the storage compartment and the ampules of semen are placed in canisters and submerged or partially submerged in this nitrogen or placed in proximity thereto. A loose-fitting plug of insulating material is inserted in the open neck and a loose-fitting protective metal cap or dust cover is placed over the neck. The loose fitting of the plug and cap permits the evaporated nitrogen to escape and thus prevents an explosive pressure build-up while minimizing entry of heat to the storage compartment. In these containers, the neck portion of the inner shell extends upward through the neck of the outer shell and presents an upper exposed terminal edge at the top of the container. The neck area, generally, and more specifically the inner shell neck, constitutes a major source of "cold loss." For instance, the inner shell neck provides a direct pathway for heat conduction into the storage compartment. Also, the access opening permits convection currents into and out of the chamber when the unit is opened to remove an ampule. These factors require that the size of the neck and the access opening be kept to a minimum and that adequate neck length be provided, all to maintain or increase field-holding time.

Ampule-holding canisters are normally lowered into the storage compartment and placed to one side of the space immediately beneath the access opening by use of handles attached to one side of each canister. These handles engage the edge of the neck of the vessel to suspend the canisters in the container and the upper ends of the handles remain exposed to be grasped for canister-retrieving purposes. The individual canisters are of a height nearly equal to the depth of the storage compartment and rest in a circle around the access opening. The storage capacity of these vessels is thus limited to that number of canisters which will define an annular ring or "storage circle" having an inner diameter approximately equal to the diameter of the access opening.

Thus, two major design criteria, namely, retrievable storage capacity and field-holding time, are in apparent conflict. An increase of storage capacity appears to require a maximum size access opening to gain a large storage circle while improvement or maintenance of field-holding time demands a minimum size access opening.

Various attempts have been made to overcome these problems, including the use of handles of various configurations to place the containers farther from a small opening to gain a larger storage circle, or a mechanical conveyor to move canisters from accessible space beneath and adjacent the access opening to and from other portions of the storage compartment. These attempts, to date, have proved largely unsatisfactory. In the first instance the presence of the handles themselves limits the number of canisters which may be retrievably placed around the opening and the use of a single large storage circle constitutes inefficient utilization of the storage space due to the large unused space beneath the access opening. In the mechanized units, malfunctioning could result from several factors such as the extreme cold, blockage of the mechanism by ice formed from condensation and blockage due to broken glass from dropped ampules; also the cost of repair or replacement of malfunctioning mechanisms is high due to the requirement of opening the vacuum vessel.

An additional and related problem encountered with the prior art devices utilizing handles for suspending the canisters was that the handles themselves constituted pathways for heat conduction into the storage compartment.

Accordingly, it is a specific object of this invention to provide an improved storage container which will overcome or minimize the various problems referred to above and provide a comparatively small, light-weight, large-capactiy, nonmechanized, cryogenic storage unit while facilitating convenient retrieving of a wide selection of stored articles and maintaining or improving field-holding time.

It is an object of this invention to increase the storage capacity of cold-storage containers without substantially increasing heat flow into the vessels.

It is an object of this invention to increase the storage capacity of cold-storage vessels without substantially increasing their size.

It is an object of this invention to minimize the number and area of paths for conduction of heat into the storage chamber of a retrievable-canister vacuum-vessel storage unit.

It is another object of this invention to provide a simple, nonmechanized storage structure for increasing the storage capacity of cryogenic vacuum-vessel storage containers.

It is a further object of this invention to provide a cryogenic storage unit which will facilitate use of either liquid gas or solid cryogens.

Further and additional objects will appear to those skilled in this art from the description, accompanying drawings and appended claims.

In carrying out this invention, in one form, a cryogenic vacuum-vessel storage container is provided with an internal support framework defining a plurality of canister-storage slots radiating from an open area beneath the storage-compartment access opening. The canisters to be stored in the storage slots are provided with shoulders adapted to engage the framework at opposite sides of each slot for suspending the canisters. The engaged portions of the framework are inclined downward inwardly of the container to urge the canisters to slide toward the area beneath the opening and against stops provided on the framework adjacent the inner ends of the slots. Each slot is dimensioned to receive at least two canisters. Readily detachable handles are provided for inserting, positioning and retrieving the canisters. One or more solid-cryogen bins may be provided within the storage compartment.

For a more complete understanding of the invention, reference should now be made to the drawings, wherein:

FIG. 1 is a perspective view, partially broken away, of a vacuum-vessel storage unit employing the teachings of this invention.

FIG. 2 is an enlarged vertical section view of a vessel of the type illustrated in FIG. 1, without the canisters and with the cover closed.

FIG. 3 is an enlarged plan view of the upper (support) plate of the vessel illustrated in FIG. 2.

FIG. 4 is a sectional view taken on line 4—4 of FIG. 3.

FIG. 5 is a plan view, on reduced scale, of the guide (lower) plate of the vessel illustrated in FIG. 2.

FIG. 6 is an enlarged sectional view taken on line 6—6 of FIG. 5.

FIG. 7 is an enlarged perspective view of the support framework of the vessel shown in FIGS. 1 and 2.

FIG. 8 is an enlarged side-elevation view, partially broken away, of one of the canisters shown in FIG. 1.

FIG. 9 is a top-plan view of the canister shown in FIG. 8.

FIG. 10 is a front-elevation view of a retriever used for inserting and retrieving the canisters in the unit shown in FIG. 1.

FIG. 11 is a side-elevation view of the retriever shown in FIG. 10.

FIG. 12 is a top-plan view of the retriever shown in FIG. 10.

FIG. 13 illustrates an auxiliary retrieving tool.

FIG. 14 is a partial top-plan view of a support framework modified to provide a bin for a solid cryogen, with several canisters shown in dashed lines.

FIG. 15 is a partial perspective view of the support framework shown in FIG. 14 with a modified canister shown in dashed lines.

FIG. 16 is a perspective view of a modified canister designed to close the space between the bin partitions of the modification as shown in FIG. 15.

FIG. 17 is a partial perspective view of a support framework modified in another manner to provide a bin for a solid cryogen.

Referring now to the particular illustrations in the drawings, FIG. 1 represents a vacuum-vessel storage unit including a vacuum vessel 10, an inner support framework 11, canisters 12 and a retrieving handle 13. The space 14 between the outer shell 15 and the inner shell 16 of the vessel 10 is evacuated of air and may be filled or partially filled with a suitable heat-insulating material. The vessel is also furnished with handles 17 and a hinged, loose-fitting metal guard cap 18 which may be fixed in a closed position by use of the illustrated fasteners and a suitable pin (not shown). A loose-fitting plug (not shown) of a heat-insulating material is also provided for placement in the neck of the vessel to minimize entry of heat into the vessel while permitting the escape of gases and thereby preventing build-up of internal pressures from the evaporation of sublimation of volatile substances such as liquid nitrogen or Dry Ice which may be used as refrigerants in the vessel.

As represented in FIG. 2, the inner wall 16 defines a storage compartment 20 which is supported by a cylindrical metal neck member 21 secured to the inner annular surface of the neck opening 15a of the outer wall 15.

Neck 21 constitutes the only access opening to compartment 20 and the compartment is of a considerably larger diameter than this opening. The neck portion of wall 15 may be reversely bent as shown in FIG. 1 to provide a smooth broad top surface.

Referring now also to FIGS. 3–7, the inner support structure within compartment 20 includes an upper support plate 22 and a lower guide plate 23 supported at their peripheries on shell 16, vertical support vanes 24 between the support plate and the guide plate, and a hat-shaped guide and abutment member 26 centrally disposed on and fixed to the bottom wall 25 of shell 16. The support and guide plates and the vanes are formed and disposed to provide an unobstructed area 27 in vertical axial alignment with the access opening and extending downwardly therefrom to member 26. The upstanding portion of member 26 is also in vertical axial alignment with the access opening and the unobstructed area 27 and constitutes an abutment surface. The support plate and the guide plate are each formed with a plurality (6) of vertically aligned slots, 28 and 32 respectively, communicating with and extending radially outward from area 27. The slots terminate in arcuate outer ends, adjacent the shell 16, conforming to the sides of the canisters 12. These slots describe a plurality of open areas or storage slots extending the full height of the compartment 20 and extending radially outward from the central open area 27.

Slots 28 define several pie-shaped segments 29 of support member 22. Each of these segments is bent downward along a line running between the arcuate portions of the adjacent slots, to incline inwardly and downwardly of the vessel (see FIG. 4). A small cylindrical stop member 31 is secured to the inner end of each segment adjacent the sides of both adjacent slots. The guide plate 23 is formed with pie-shaped segments 33 similar to and aligned with the segments of plate 22 except that the segments 33 are not bent downwardly (see FIG. 6). Each of the aligned slots 28 and 32 is of a depth to receive at least two canisters; however, slots 32 are somewhat deeper than slots 28 to allow for tilting of the bottom of the canisters outwardly as will be later explained.

Referring now also to FIGS. 8 and 9, each canister 12 consists of an open-top, hollow receptacle defined by a cylindrical wall 30 and a foraminous bottom wall 56. A circumannular support shoulder 57 extends around each canister a short distance below its upper end. This shoulder is Z-shaped in cross section, with one leg 57a of the Z joined to the canister and another leg 57b spaced from the canister wall and extending downwardly to define a circumannular slot 58. The canisters are of a height to fit conveniently within the storage chamber defined by shell 16 and are of a diameter to fit closely but easily within the slots of plates 22 and 23. Shoulders 57 extend outwardly to a diameter greater than the width of the slots whereby the lower edge of leg 57b will engage upon the adjacent portions of segments 29 when a canister is placed in a storage slot. Shoulder 57 is vertically positioned on the canister so that the lower end of the canister abuts against the side wall 34 of member 26 but is supported above bottom wall 25.

FIGS. 10–12 illustrate a retrieving handle 13 for inserting and retrieving the canisters in the storage compartment. The handle includes an elongated stem portion 36 and a canister gripper 37 at one end of the stem. The gripper includes a lip 38 spaced from the handle and an arcuate portion 39. Lip 38 is adapted to slide into annular space 58 on the canisters and arcuate portion 39 corresponds to the curved surface of wall 30 whereby the canisters may be easily but positively engaged with the handle.

FIG. 13 illustrates an auxiliary retrieving device 40 having a lateral extension 41 and a hook 42 which may be used to move a canister from an outward portion of a storage slot toward the center of the storage compartment 20.

FIGS. 14–17 illustrate modifications of the basic storage unit to adapt it for optional use of solid cryogens with a fluid circulating refrigerant. In the modification shown in FIGS. 14–16, the vertical vanes 24 are eliminated between segments 29a, 33a, and 29b, 33b and replaced by foraminous walls 43 and 44 extending from the upper support plate 22 to the compartment floor 25 at the opposite edges of these segments. The outer ends of walls 43 and 44 are adjacent the outer edge of the plates (and thus adjacent shell 16), while the inner end portions 45 and 46 are curved inwardly toward one another and then outwardly for a short distance along the sides of the encompassed storage slot 47 as shown. A modified canister 48 (see FIG. 16) is adapted to serve as a gate for closing the inner end of the storage slot 47, between end portions 45 and 46. This gate-canister is cut away on the side to be outwardly disposed and is foreshortened above the shoulder 57. At its lower end canister 48 is provided with a prong 49 adapted to engage an opening 50 in guide member 26a for positioning the lower end of the gate. The upper end is supported against the two adjacent stops 31. The foreshortened top portion provides room above the modified canister to permit insertion of a solid cryogen delivery means such as a flexible tube or trough (not shown) whereby a substance such as Dry Ice, either chunks, cracked or ground, can be delivered to the bin delimited by walls 43 and 44 and gate 48, either through the open top of the gate 48 or through the included slot 28. A fluid refrigerant such as alcohol may be included in the storage compartment to circulate through the bin and the remainder of the compartment to insure uniform cooling of all parts of the compartment and the stored contents.

In the modification illustrated in FIG. 17, the vane 24 between segments 29c, 33c is eliminated, and a continuous foraminous wall 52 having opposing planar portions 52a and 52b is provided extending along and between both edges of these segments and terminating closely adjacent shell 16 as shown. An opening 53 is provided in segment 29c to provide access for placing a solid cryogen in the bin partitioned off by wall 52. Similar bins may be provided at other segments of the same container as is found necessary with a particular refrigerant substance or mixture.

In the two solid-cryogen-bin modifications illustrated, the support plate 22 constitutes an upper partition of the bin and either the guide plate 23 or the floor 25 serves as a transverse lower wall. The use of plate 23 as a lower limit of the bin has at least one advantage in that this construction permits the circulating refrigerant to contact and/or flow through a greater area of the cryogen-bin walls for more efficient circulation and cooling. The foraminous walls, of course, permit effective circulation of the circulating fluid refrigerant to insure uniform cooling, but confine the solid cryogen to prevent its interference with the orderly, easy and convenient manipulation of the canisters or other articles stored in the compartment 20.

The various parts of the support structure and vessel may be secured together by any means suitable to the materials utilized and suitable to the maintenance of the required vacuum between the shells without creating obstructions within the storage compartment. In the preferred embodiment, made of stainless steel, the various parts of the vacuum vessel are welded together, and the support structure has been fabricated and positioned by spot-welding, as in securing mounting ears 55 to the plates and to the shell 16.

It will be obvious to those skilled in this art that other modifications of the illustrated embodiments may be made without departing from the spirit and scope of this invention. For instance, narrow inclined tracks may be substituted for the inclined segments, guide fingers may be substituted for the guide plate, other supports may be substituted for the vanes, the storage slots may be disposed along radiating lines at angles oher than along radii, a canister may be utilized for a solid cryogen, and other insulation and construction materials may be utilized.

In the illustrative operation, a plurality of ampules of frozen semen from different bulls are arranged in the various canisters and catalogued. The storage compartment is partially filled with liquid nitrogen and the loaded canisters placed in the storage slots. This placement is accomplished by engaging each canister, successively, with the retrieving handle, and lowering the canisters one at a time into the open space 27. The first canister to be placed in each storage slot is placed to the side of guide member 26 and behind the respective stops 31. Member 26 extends radially outward a sufficient distance, relative to the positioning of stops 31, to tilt the bottom of the canisters outward to the point where the canisters are suspended substantially normal to the inclined segments 29. The second canister to be placed in each slot is inserted the same as the first, the second canister causing the first to slide to the outer end of the storage slot into abutment with the outer end of the slot. With two canisters in each slot, the outer edges of the slots, the stops 31 and guide member 26 cooperate to confine the canisters against lateral movement. It is desirable to leave one canister spaced unoccupied to permit movement of an inner canister from another slot should it be necessary to gain access to a canister stored in an outer position without unnecessarily removing a canister from the compartment and exposing it to ambient temperature conditions. To obtain a desired ampule, the correct canister is selected and, if necessary, moved to an inner position. This canister is engaged with a retrieving handle and raised approximately to the position of canister 12a in FIG. 1. The desired ampule is removed and the canister immediately replaced in its storage position in the refrigerated compartment to prevent undue exposure of its contents. The inclination of the support-plate segments, aided by the inclination of the canisters imparted by member 26, causes the canisters to slide naturally toward the inner accessible position under the influence of gravity. Should a canister become bound in the outer position, as by freezing of water condensate, the tendency to slide to the center can be enhanced by tilting the vessel or by use of a retrieving handle of the type illustrated in FIG. 13.

The provision of solid-cryogen bins in the various modifications does not interfere with "normal" use of a liquid cryogen, such as liquid nitrogen, but provides stand-by means for maintaining low temperatures in emergencies when only a solid cryogen may be available or when, for other reasons, it is desired to use a solid cryogen.

It will thus be seen that an improved cryogenic storage container has been provided which efficiently utilizes the available storage space to provide high storage capacity in a comparatively small and thus lightweight unit and which permits convenient retrieving of a wide selection of stored articles. This has been accomplished without increasing the size of the access opening and thus without increasing the heat flow into the vessel. In fact, due to the minimizing of the paths of heat conduction into the storage chamber by elimination of the permanent, protruding handles, a somewhat diminished inward heat flow is provided, thus improving field-holding time. Conversely, this improvement permits the use of less cryogen for a given period of holding time and hence also contributes to a smaller, lighter weight unit. The space in the storage compartment is utilized in an unobvious manner which effectively increases the storage capacity without a corresponding increase in the neck size or the overall size of the unit and without the use of movable mechanical elements in the storage chamber. Additionally, the modified support structure provides convenient means for optionally using a liquid cryogen or a solid cryogen. The form of the canister gripper means on the retriever handles, in cooperation with the shoulders on the canisters, results in detachable handles which can be readily and firmly engaged with the canisters under the poor visibility conditions normally prevailing in this type of container. The support shoulders serve a double function in providing support means for the canisters in the storage compartment and an attachment means for the retrieving handles.

The present invention has been particularly described in connection with storage and handling and particularly field-handling of frozen bovine semen. In these circumstances compact size, light weight, and field-holding time are extremely important factors because of the logistics problems and costs involved in frequently resupplying many individual field technicians with semen and with liquid nitrogen and because the container unit should be suitable for lifting and movement without excessive effort and for transportation in the trunk compartments of most conventional automobiles. Also, size and weight versus product capacity are important for reducing costs when shipping by commercial carrier, as is often done in this field. However, it should be clear that the illustrated invention is not limited to use for the purposes referred to herein. For instance, the invention will find application in storing, handling or preserving other biological or physiological specimens such as whole human blood; body parts such as arteries, bones and tissues; laboratory specimens or samples of various kinds; and quick-freezing of small products or specimens as well as other uses in which advantage may be taken of the concepts of the invention. Also, other solid or liquid cryogens may be utilized and other liquid circulating refrigerants may be utilized with the solid cryogens; liquid nitrogen, and Dry Ice with alcohol, are suggested as illustrative of available refrigerant substances which are practical in known uses.

While particular embodiments of the invention have been shown, it will be understood, of course, that the invention is not limited thereto since modifications may be made by those skilled in the art in light of the foregoing teachings. It is contemplated, therefore, by the appended claims to cover any such modifications as fall within the true spirit and scope of the invention.

We claim:

1. In a normally upright insulated container having an internal compartment adapted for product and volatile refrigerant storage and a single access opening communicating with said compartment for insertion and retrieval of products to be refrigerated therein, the access opening being at the top of said container and being substantially smaller than the horizontal cross-sectional area of the compartment, the improvement comprising a fixed framework within said compartment adapted to receive and support elongated articles placed therein, said framework defining a plurality of storage slots accessible through said access opening for insertion of such articles, said slots extending horizontally outward on opposite sides of the area directly beneath said opening to outer end portions laterally spaced from the area beneath said access opening, said framework including means for supporting such articles in vertically upright position in said slots, whereby such articles may be placed in said container through said access opening, moved outward in said compartment relative to said access opening along said slots for storage therein and subsequently retrieved from said slots through said access opening.

2. The improvement in a container as in claim 1 and wherein said framework includes a support member formed with slots corresponding to said storage slots, at least the portions of said member adjacent said slots therein being inclined downwardly toward the area beneath the access opening.

3. The combination of a container with a support framework as in claim 2 and a plurality of receptacles of a height to fit within the compartment and having lateral dimensions to permit passage through the access opening and to fit within said storage slots, each of said receptacles being provided with shoulders extending laterally thereof to engage the inclined portions of said support member at each side of a slot therein and disposed to support each receptacle on said member, and each of said storage slots being of a lateral depth to receive at least two of said receptacles.

4. The improvement in a container as in claim 1 and wherein said framework delimits a bin having at least one foraminous wall.

5. A cryogenic storage unit comprising a vacuum vessel having an inner compartment and an access opening through the top of said vessel communicating with said compartment for passage of canisters, said inner compartment being of substantially greater cross-sectional area than said access opening; a framework within said compartment for receiving and supporting stored canisters, said framework disposed to provide an unobstructed area corresponding to said access opening and extending substantially the full depth of said compartment from said access opening, said framework including a support member having a plurality of slots therein radiating outwardly from and communicating with said unobstructed area, the segments of said member between said slots being inclined downwardly toward said unobstructed area; stop members on the inner ends of said segments adjacent said slots; a plurality of canisters having lateral dimensions to fit within said slots and of a height to fit within said compartment; each of said canisters including side walls and external shoulders extending therefrom to engage said support member and the stops at opposite sides of one of said slots, said shoulders disposed to support said canister on said support member above the bottom of said compartment; each of said slots being of sufficient depth transverse to said opening to receive at least two of said canisters; and means disposed beneath said member for guiding and limiting the movement of the lower ends of said canisters.

6. In combination with a cryogenic storage unit as in claim 5, a canister-retrieving device having attachment means for detachably engaging said shoulders and the side walls of said canisters for inserting and retrieving the canisters.

7. A cryogenic storage unit as in claim 5 and wherein said means includes a guide member formed with slots corresponding to and vertically aligned with the slots in said support member; and an abutment in the lower portion of said unobstructed area extending laterally to abut the lower end of said canisters when said canisters are disposed in aligned slots of said support and guide members, against said stops, and substantially normal to said segments.

8. In a normally upright insulated container having an internal compartment adapted for product and volatile refrigerant storage and a single access opening communicating with said compartment for insertion and retrieval of products to be refrigerated therein, the access opening being at the top of said container and being substantially smaller than the horizontal cross-sectional area of the compartment, the improvement comprising a fixed framework within said compartment adapted to receive and support receptacles placed therein, said framework defining an unobstructed area substantially the depth of said container directly beneath said access opening and a plurality of storage slots extending horizontally outward from opposite sides of said unobstructed area to outer end portions laterally spaced from the area beneath said access opening, said framework including means for supporting such receptacles in vertically upright position in said slots whereby receptacles may be placed in said container through said access opening, moved outward relative to said access opening into said slots and retrieved from said slots through said access opening.

9. In a normally upright insulated container having an internal compartment adapted for product and volatile refrigerant storage and a single access opening communicating with said compartment for insertion and retrieval of products to be refrigerated therein, the access opening being at the top of said container and being substantially smaller than the horizontal cross-sectional area of the compartment, the improvement comprising a fixed framework within said compartment adapted to receive and support elongated receptacles placed therein, said framework including a generally horizontally disposed support member mounted in the upper portion of said compartment, said member formed with a plurality of storage slots accessible through said access opening for insertion of such receptacles and extending horizontally outward on opposite sides of the area directly beneath said access opening to outer end portions laterally spaced from the area beneath said access opening, said member including means for supporting such receptacles in vertical upright position in said slots, whereby receptacles may be placed in said container through said access opening, moved outward in said compartment relative to said access opening along said slots for storage therein and subsequently retrieved from said slots through said access opening.

10. In a normally upright insulated container having an internal compartment adapted for product and volatile refrigerant storage and a single access opening communicating with said compartment for insertion and retrieval of products to be refrigerated therein, the access opening being at the top of said container and being substantially smaller than the horizontal cross-sectional area of the compartment, the improvement comprising a fixed framework within said compartment adapted to receive and support elongated receptacles placed therein, said framework defining a plurality of storage slots accessible through said access opening for insertion of such receptacles, said slots extending horizontally outward on opposite sides of the area directly beneath said opening to outer end portions laterally spaced from the area beneath said access opening, said framework including means for supporting such receptacles in vertically upright position in said slots and for movement along said slots, each of said slots being of a width corresponding to the lateral dimension of such receptacles and of a depth, measured outward of the area beneath said opening, substantially greater than said width whereby at least two such receptacles may be placed in each of said slots through said access opening for storage therein and subsequently retrieved from said slots through said access opening.

11. A storage unit comprising a normally upright insulated container having an internal compartment adapted for product and volatile refrigerant storage and having an access opening through the top thereof communicating with said compartment, said access opening being substantially smaller than the horizontal cross-sectional area of the compartment, a fixed support framework within said compartment, said framework defining a plurality of storage slots accessible through said access opening for insertion of receptacles to be stored therein and extending horizontally outward transversely of said access opening, and a plurality of receptacles of a height to fit within said compartment and having lateral dimensions to permit passage through the access opening and to fit within said storage slots, said framework and said receptacles including engaging means for supporting said receptacles in vertically upright position in said slots whereby said receptacles may be placed in said container through said access opening, moved horizontally along said slots and subsequently retrieved from said slots through said access opening.

12. A storage unit as in claim 11 and wherein each of said storage slots is of a depth transversely of said opening to receive at least two of said receptacles.

13. In a container having an internal compartment adapted for product and volatile refrigerant storage and an access opening through the top communicating with said compartment, the access opening being substantially smaller than the cross-sectional area of the compartment transverse to the axis of the opening, the improvement comprising a support framework within said compartment, said framework including a pair of vertically aligned transverse plates formed with slots defining a plurality of storage slots accessible through said access opening for insertion of objects to be stored, said storage slots extending outward transversely of said access opening, and a pair of foraminous wall portions disposed between two adjacent storage slots and extending between said two plates, said foraminous wall portions and said plates delimiting a bin, and the upper of said plates having an opening therethrough communicating with said bin.

14. In a container having an internal compartment adapted for product and volatile refrigerant storage and an access opening through the top communicating with said compartment, the access opening being substantially smaller than the cross-sectional area of the compartment transverse to the axis of the opening, the improvement comprising a support member within said compartment, said member defining a plurality of storage slots accessible through said access opening for insertion of objects to be stored, said storage slots extending outward transversely of said access opening, a pair of foraminous walls disposed one to each side of one of said storage slots, each foraminous wall extending horizontally from the respective side of the inner end of said one slot outwardly substantially to the side of said compartment and extending downwardly from said member, a transverse member extending between the downward ends of said foraminous walls, and a gate member mountable across the inner end of said one storage slot between said foraminous walls to delimit a bin within said compartment.

References Cited in the file of this patent

UNITED STATES PATENTS

| 1,937,877 | Edwards | Dec. 5, 1933 |
| 1,952,444 | Leopard | Mar. 27, 1934 |
| 2,161,295 | Hirschberg | June 6, 1939 |
| 2,610,100 | Childers | Sept. 9, 1952 |
| 3,034,845 | Haumann | May 15, 1962 |
| 3,052,370 | Haumann | Sept. 4, 1962 |

FOREIGN PATENTS

| 824,702 | Great Britain | Dec. 2, 1959 |

UNITED STATES PATENT OFFICE
CERTIFICATE OF CORRECTION

Patent No. 3,108,840                      October 29, 1963

Edwin O. Conrad et al.

It is hereby certified that error appears in the above numbered patent requiring correction and that the said Letters Patent should read as corrected below.

Column 2, line 19, after "from" insert -- the --; column 3, line 69, for "of", first occurrence, read -- or --; column 5, line 75, for "oher" read -- other --; column 6, line 24, for "spaced" read -- space --.

Signed and sealed this 14th day of April 1964.

(SEAL)
Attest:
ERNEST W. SWIDER

EDWARD J. BRENNER

Attesting Officer

Commissioner of Patents